United States Patent
Chatelin et al.

[11] Patent Number: 5,885,453
[45] Date of Patent: Mar. 23, 1999

[54] DEVICE FOR THE PHYSICOCHEMICAL SEPARATION OF CONSTITUENTS OF A FLUID

[75] Inventors: Roger Chatelin, Lissieu; Daniel Monget, Saint Sorlin en Bugey; Thierry Pollet, Ecully; Catherine Fitzer-Couturier, Dagneux; Patrick Gayrine, Ecully, all of France

[73] Assignee: Institut Textile De France and Bio Merieux, France

[21] Appl. No.: 776,995

[22] PCT Filed: Jun. 22, 1996

[86] PCT No.: PCT/FR96/00954

§ 371 Date: Feb. 19, 1997

§ 102(e) Date: Feb. 19, 1997

[87] PCT Pub. No.: WO97/00715

PCT Pub. Date: Jan. 9, 1997

[30] Foreign Application Priority Data

Jun. 22, 1995 [FR] France .................................. 95-07740

[51] Int. Cl.⁶ ........................... B01D 63/00; B01D 24/56
[52] U.S. Cl. ........................ 210/321.75; 210/321.84; 210/488; 210/495; 210/496; 210/504; 210/506; 210/510.1; 55/385.4; 55/524; 427/244
[58] Field of Search ...................... 427/2.13, 244; 435/13; 436/66; 422/55, 57, 58, 61, 73, 69; 55/524, 385.4; 210/649, 658, 321.84, 483.488, 495, 496, 502.1, 504, 506, 912, DIG. 5, DIG. 7, 321.75, 321.76, 321.85, 493.4, 497.1

[56] References Cited

U.S. PATENT DOCUMENTS

| 4,036,760 | 7/1977 | Bardonnet et al. | 210/323.1 |
| 4,798,676 | 1/1989 | Matkivich | 210/767 |
| 5,186,713 | 2/1993 | Raible | 604/4 |
| 5,211,850 | 5/1993 | Shettigar et al. | 210/645 |
| 5,316,676 | 5/1994 | Drori | 210/411 |
| 5,476,587 | 12/1995 | Kuroki et al. | 210/496 |
| 5,498,336 | 3/1996 | Katsurada et al. | 210/496 |
| 5,591,337 | 1/1997 | Lynn et al. | 210/489 |
| 5,601,718 | 2/1997 | Tsubakino | 210/495 |
| 5,665,238 | 9/1997 | Whitson et al. | 210/649 |

FOREIGN PATENT DOCUMENTS

| 6610028 | 1/1973 | Germany . |
| 8815404 | 5/1989 | Germany . |

OTHER PUBLICATIONS

Patent Abtracts of Japan, vol. 2, No. 15 (C–77) [3894], 31 Jan. 1978 & JP,A,52 114473 (Toyo Boseki K.K.), 26 Sep. 1977.

Patent Abstracts of Japan, vol. 2, No. 46 (C–77) [5124], 28 Mar. 1978 & JP,A,53 011766 (Mitsubishi Rayon K.K.), 7 Jan. 1978.

Primary Examiner—David A. Reifsnyder
Attorney, Agent, or Firm—Wall Marjama Bilinski & Burr

[57] ABSTRACT

Apparatus for physicochemical separation and filtering constituents of fluids having a flexible leak-tight or semipermeable casing which tightly envelopes a filter material and inlet and outlet pipes for passing a fluid through the casing in contact with the filter material. The casing is made in a flat profile that can be formed into various shapes such as spirals, ribbons or the like.

10 Claims, 3 Drawing Sheets

DEVICE FOR THE PHYSICOCHEMICAL SEPARATION OF CONSTITUENTS OF A FLUID

BACKGROUND OF THE INVENTION.

The invention relates to a device for separation of the constituents of all fluids, that is to say both liquids and gases, which device operates by a physicochemical route.

In the continuation of the description and in the claims, the term "separation" should be understood in its widest sense, that is to say filtration proper, but also the retention of particles, of charges, of microparticles, of ions of dissolved species, ionic or otherwise, separation or immobilization. These different actions are capable of resulting in the concentration, refining or purification of the fluid subjected to these actions. The invention also relates to the functionalization of the medium during the separation, the stage preliminary to subsequent diagnostic or working operations of the functionalized support.

Separation is carried out in a great many fields for diverse and varied applications. Thus, in the very general fields of chemistry and biology, it frequently proves necessary to carry out phase concentrations, separations or purifications in the context of analysis and in industrial processes.

To do this, recourse is commonly had either to conventional filters (disc filters, plate filters, filter presses, precoat filters), which require significant filtration equipment, or to filter cartridges, which require heavy molds for their manufacture. In both cases, consequent ullages are generated and, moreover, such filters exhibit a partition coefficient which is most often unsatisfactory or limited.

For other applications, recourse is had, for the separation of ionic species, to ion exchange resins. Such resins are, in a known way, composed of beads and microbeads functionalized according to the type of exchange desired.

Whatever the process of separation employed and its corollary, the equipment which enables this separation to be carried out, a certain number of problems remain, including the ullages generated by the equipment as well as its bulk, indeed its weight also, and its investment.

Applications increasingly demand, in order to carry out a direct measurement, a separation process capable of being carried out in line without an intermediate stage of collection of the fluid to be analyzed.

Moreover, the search is increasingly to increase the kinetics of separation, without, for all that, detrimentally affecting the results of this separation.

SUMMARY OF THE INVENTION.

The object of the invention is to provide a physicochemical separation device for all types of fluid which overcomes these disadvantages with maximum efficiency for a minimum filter charge and which makes it possible to carry out an in-line separation in order to carry out and to obtain, immediately, results of measurement or of analysis, while optimizing the kinetics of the process.

This device for the physicochemical separation of fluids is equipped with a pipe for introduction of fluid to be filtered and with a pipe for departure of said fluid thus filtered and comprises, between the two pipes, a filter material based on textile fibers placed in the path of the fluid. The expression filter material, as used in the present application, refers to any material appropriate for separation, as defined above.

This device is characterized in that it is composed of a flexible leaktight or semipermeable casing made of plastic which tightly envelopes the filter material, so as to constitute a filter with a flat profile or capable of adopting a flat profile, the separation taking place in the plane of the filter and with respect to the flat profile of the filter material.

This configuration makes it possible to enjoy a consequent separation profile equivalent to the greater length of the medium and not to its thickness, as in conventional filtration, for minimum bulk, charge and ullage.

In other words, the invention comprises tightly enveloping a filter material within a flexible plastic casing intended to restrict the path of the fluid in the filter material without, for all that, bringing about a preferential path, one of the results of which is an increase in the progression of the fluid in contact with the textile fibers of the filter material, in this way promoting leaching or contact phenomena. In this way, maximum efficiency of the separating power is obtained for a minimum mass.

In one embodiment of the invention, the flexible casing is tubular and is produced from a heat-shrinkable or drawable material, so as to make possible with ease the introduction of the filter material or media into said casing and then to confine it by raising the temperature or by a mechanical route.

According to an advantageous characteristic of the invention, the flexible leaktight or semipermeable casing is composed of two plastic sheets heat-welded to one another and gripping the filter material, the assembly thus produced then being subjected to an embossing or calendering, so as to confine, as much as possible, the filter material within said casing and consequently to optimize the progression of the fluid in contact with said filter material. This casing can be produced from any appropriate material which satisfies the conditions of leaktightness, of resistance to the pressure of a fluid and of transparency, if appropriate, required. It is, for example, produced from plastic, such as from polyethylene, polypropylene, a polyethylene/polypropylene mixture, and the like, and it is capable of being of biocompatible, food or sterile grade, and the like, according to the destination and use of the separation device thus formed.

According to another embodiment, the leaktight casing imposing the progression and the maximum contact of the fluid with the filter material is composed of a single-layer or of a double-layer based on a nonwoven or on a textile, coated on one of its faces or receiving, by film coating on one of its faces, a PVC or equivalent or laminated with a plastic film, in particular produced from poyethylene [sic]. This single-layer or this double-layer thus obtained is wound in the form of a contiguous or folded spiral, the interturn or interfold space receiving the filter material, and the assembly being inserted within a heat-shrinkable sheath, capable of modulating the porosity of the device, the rate of passage of the fluid, the separative efficacy, the compactness of the system and its ullage, and the like, by modifying the winding pressure or the squeezing of the folds.

In an alternative form of this embodiment, a grid or a drain is inserted between the filter material and the leaktight layer or sheath, in order to promote leaching and movement of the fluid.

The filter material is composed, for example, of a fibrous, filamentary or cellular material chosen from those conventionally used as filter media and in particular activated charcoal, viscose, cotton, polypropylene, asbestos, glass, and the like.

The constituents of this filter material can be negatively or positively charged and are capable of undergoing a grafting which confers ionic exchange properties on them (anions, cations, indeed complexing agents), so as thus to create ion exchange textiles, hydrophilic textiles, hydrophobic textiles, and the like.

In a known way, the grafting comprises the development, from a polymer, of various macromolecular chains each possessing several tens or several hundreds of functional sites which are polar, hydrophobic, hydrophilic, organophobic, organophilic, oxidizing and/or reducing or capable of attaching an active principle of chemical or biological nature.

The accessibility and the concentration of the sites by grafting result in kinetics and an efficiency which are better than those obtained to date.

The fibers can be functionalized or functionalizable using a functionalization agent, such as any appropriate chemical group or activated arm or arm which can be activated, capable of reacting with a specific anti-ligand for the purpose of a possible subsequent reaction with a ligand (or target molecule) capable of being present in a sample. The anti-ligand is in particular chosen in order to form an anti-ligand/ligand complex. By way of example, the complex can be in particular represented by any antigen/antibody, peptide/antibody, antibody/hapten or hormone/receptor pair, polynucleotide/polynucleotide or polynucleotide/nucleic acid hybrids, or the like.

The functionalization agent can in particular be chosen from alkyl or alkoxy chains or substituted or unsubstituted polyethers which are terminated by a group carrying a reactive functional group. The reactive functional group is in particular represented by a functional group such as a carboxy, hydrazide, amine, nitrile, aldehyde, thiol, disulfide, iodoacetyl, ester, anhydride, tosyl,. mesyl or silyl group and any reactive functional group capable of reacting with a specific anti-ligand.

The term "polynucleotide" as used in the present invention denotes a sequence of at least five deoxyribonucleotides or ribonucleotides optionally comprising at least one nucleotide containing a modified base, such as inosine, 5-methyldeoxycitidine, 5-(dimethylamino)deoxyuridine, deoxyuridine, 2,6-diaminopurine, 5-bromodeoxyuridine or any. other modified base which makes possible hybridization. This polynucleotide can also be modified at the internucleotide bond (such as, for example, the phosphorothioate, H-phosphonate or alkyl-phosphonate bonds) or at the skeleton, such as, for example, alpha-oligonucleotides (FR-A-2,607,507) or PNAs (M. Elghom et al., J. Am. Chem. Soc., (1992), 114, 1895–1897). Each of these modifications can be taken in combination.

The term "peptide" as used in the present invention means in particular any peptide containing at least two amino acids, in particular protein or protein fragment or oligopeptide, extracted, separated or substantially isolated or synthesized, in particular those obtained by chemical synthesis or by expression in a recombinant organism; any peptide in the sequence of which one or a number of amino acids of the L series is (are) replaced by an amino acid of the D series, and vice versa; any peptide in which at least one of the CO—NH bonds, and advantageously all the CO—NH bonds, of the peptide chain is (are) replaced by (a) NH—CO bonds, the chirality of each aminoacyl residue, whether it is or is not involved in one or more abovementioned CO—NH bonds, being either retained or inverted with respect to the aminoacyl residues constituting a reference peptide, these compounds being further denoted as immunoretroids; a mimotope, and the like.

A reactive functional group capable of reacting with the functionalization agent described above can be introduced at any position of the polynucleotide or of the peptide.

The term "antibody" as used in the present application means any monoclonal or polyclonal antibody, any fragment of said antibody, such as Fab, Fab'2 or Fc fragment, and any antibody or fragment obtained by genetic modification or recombination.

Haptens are small non-immunogenic molecules, that is to say incapable by themselves of promoting an immune reaction by formation of antibodies but capable of being recognized by antibodies obtained by immunization of animals under known conditions.

The base material is provided in the form of a a bed which maybe, among other things, fabric, of a nonwoven, of a paper, of fibers or of filaments.

The filter material is also capable of being composed of an alveolate material, such as foams, sponges, zeolites, and the like.

BRIEF DESCRIPTION OF THE DRAWINGS

The way in which the invention can be implemented and the advantages which result therefrom will emerge more clearly from the implementational examples which follow, given by way of information and without implied limitation, with the support of the appended figures.

FIG. 1 represents diagrammatically a characteristic device of the invention, seen from above, of which

FIG. 4 is a diagrammatic representation of yet another embodiment of the invention, of which

FIG. 6 is a diagrammatic representation of another embodiment of the invention, of which

DESCRIPTION OF THE INVENTION

Figure 1:
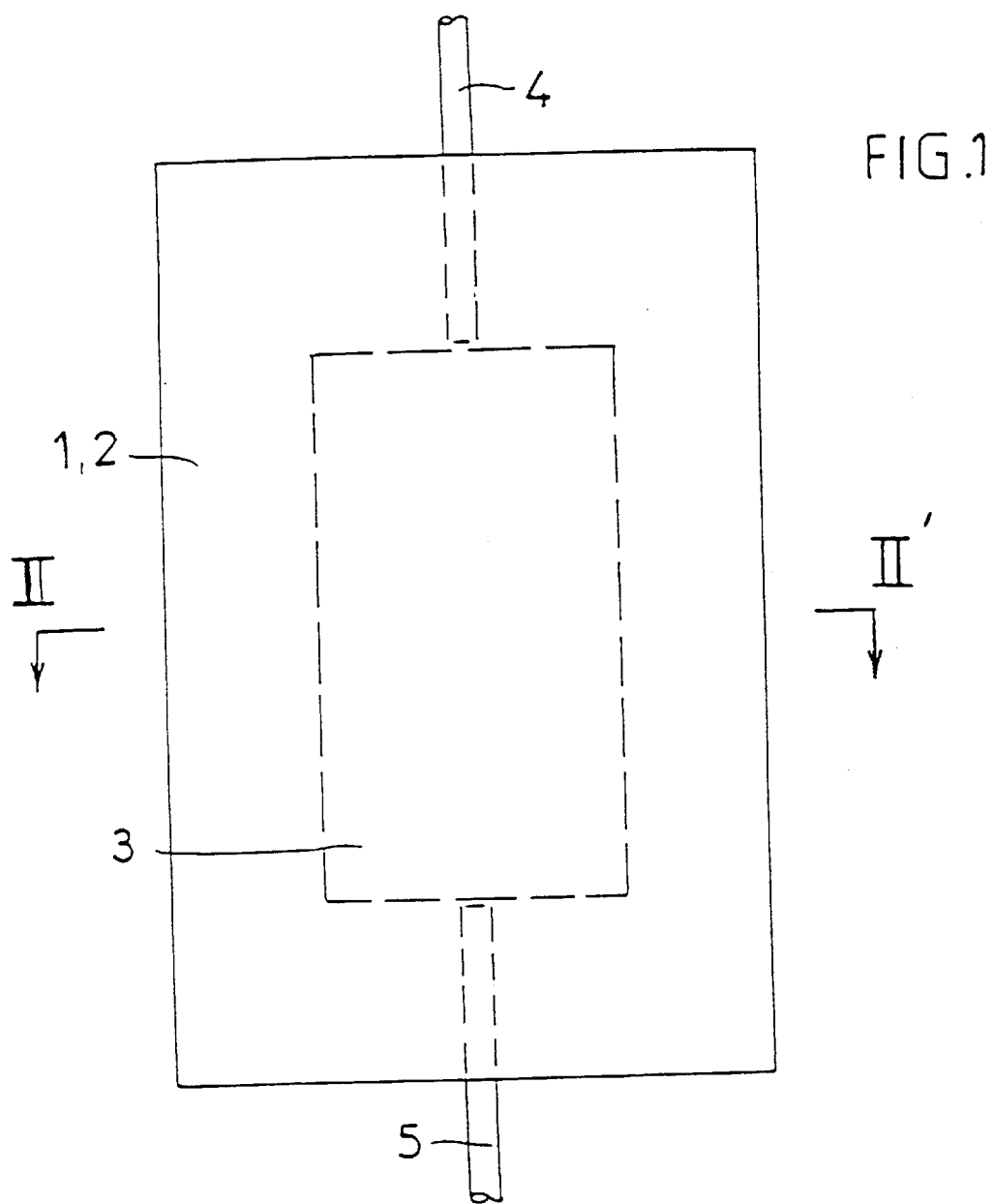

The separation device in accordance with the invention is represented very diagrammatically in FIG. 1. This device is composed of two substantially rectangular sheets (1) and (2), produced from polyethylene, tightly gripping a woven fabric, for example composed of activated charcoal fibers (3), and abutting onto two pipes, respectively a pipe for introduction (4) of the fluid to be separated or to be filtered and for departure (5) of the fluid thus separated or filtered.

In a known way, carbon fibers are materials which exhibit advantageous mechanical characteristics, in combination with a low relative density, which makes it possible to use them in the most varied textile forms, such as filaments, fibers, fabrics or braids, which may be two- or three-dimensional. These fibers are most generally manufactured by pyrolysis of a precursor, in particular based on fibers which are cellulose and which are natural or artificial, indeed synthetic (acrylic fibers). As these carbon fibers are well known, there is no reason to describe them here in more detail.

Figure 2:
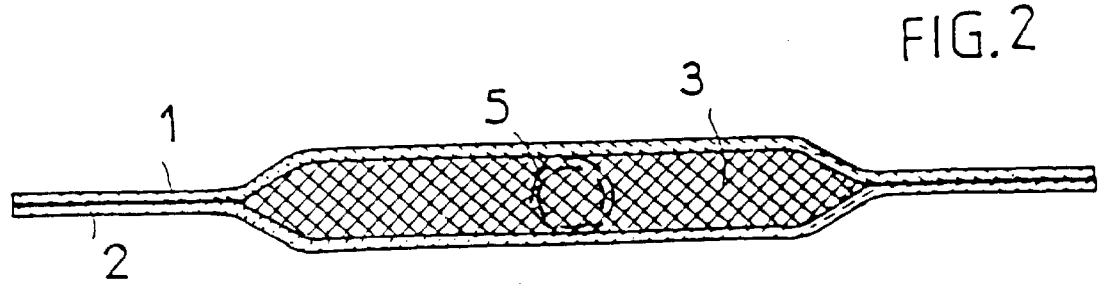
FIG. 2 is a section along the axis II—II according to FIG. 1.

The whole periphery of the casing (1, 2) thus constituted gripping the fabric (3) is heat-welded under slight pressure, so that the films (1) and (2) constituting said casing are in close contact with the fibrous media (3) and completely welded to the periphery of the fabric, as can clearly be observed in FIG. 2.

By the use of films (1) and (2) produced from flexible polyethylene, the end result is a substantially flat separation profile, as can also be observed in FIG. 2, capable of deforming with respect to this plane, in particular folding up or bending, the fabric of the filter material (3) also exhibiting the flexibility capable of adapting to these deformations.

In addition, advantageously, the device thus produced is subjected to an embossing or calendering, so as to enable the filter material (3) to be gripped as tightly as possible between the two films (1) and (2), so as to preclude or limit any preferential progression of the fluid to be filtered outside the body of the fabric (3) between the introduction conduit (4) and the departure conduit (5), both emerging in the fabric. It is also possible to lengthen the progression of the fluid to be filtered or separated by twists and turns, produced within the casing (1, 2), for example by heat welding, the filter material (3) then adopting an additional profile.

The pressure exerted during the embossing or calendering depends, on the one hand, on the filter material used and, on the other hand, on the desired rate and desired efficiency of separation. Of course, the greater this pressure, the greater the confinement of the filter material (3) within the leaktight casing and, consequently, the slower the rate of separation. In fact, it can be advantageous to result in a balance, in order to optimize as far as possible these kinetics of separation, without detrimentally affecting, for all that, the desired degree of separation.

Figure 3:
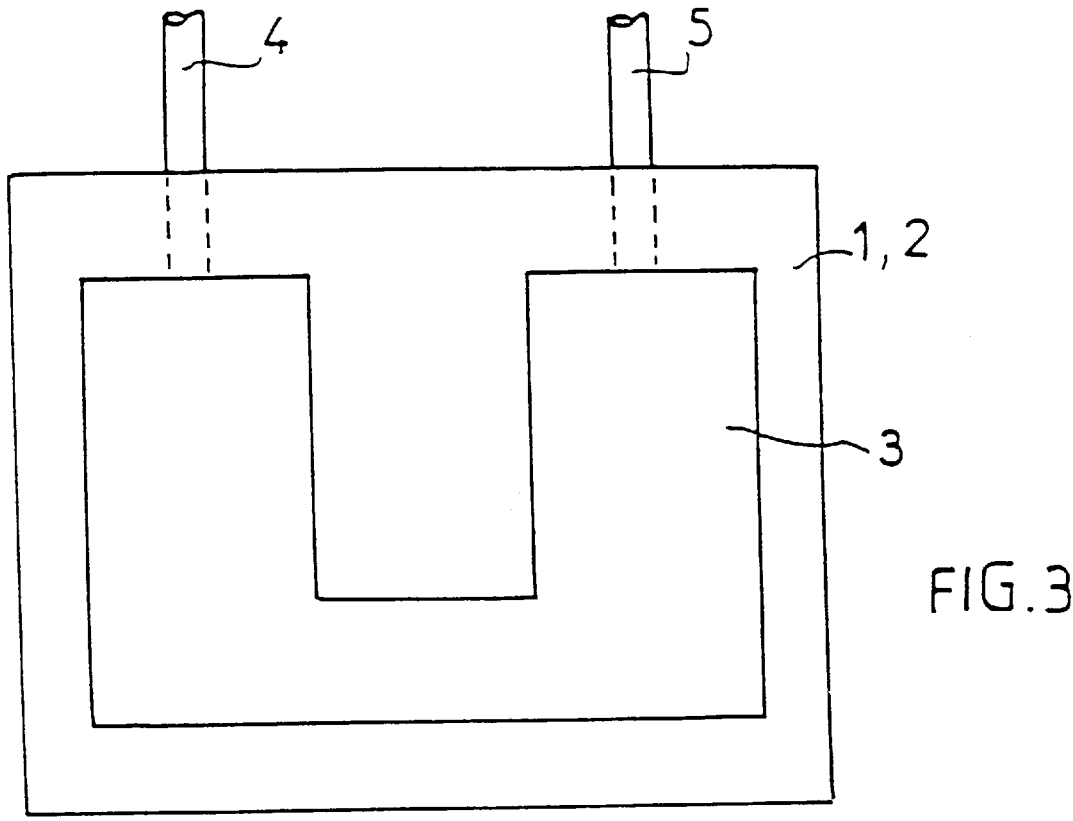
FIG. 3 is a diagrammatic representation of another embodiment of the device in accordance with the invention.

In another embodiment represented in FIG. 3, the filter material is provided, seen from above, in the form of a U, the introduction and departure conduits terminating respectively at the end of the branches of the U. This embodiment can be used when it is desired to optimize the leaching in contact with the filter material (3) which, this time, is, on the one hand, inherent to the confinement and, on the other hand, to the path of the fluid in the ascending direction in the second branch of the U. It has been observed that this embodiment did not significantly detrimentally affect the kinetics of separation.

These two embodiments are thus provided in the form of a flat profile, which can optionally be bent, which is entirely capable of being inserted in an envelope for the purpose of being sent to any place, in this way enabling on-the-spot or in-line samples to be sent very simply to places for specific analysis.

Figure 4:
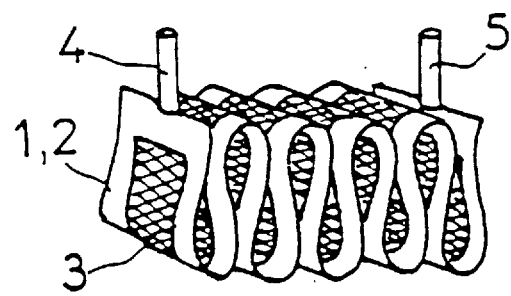

In another embodiment-represented in FIG. 4, use is made, as separation device, of a device analogous to that of FIG. 1 but which is folded over a number of times on itself in various convolutions, the latter being kept in contact with one another before use, for example by very weak points of adhesion or equivalent. In this way, before use, such separation devices have a bulk which is very particularly reduced and, of course, a very low weight. During their use, it is sufficient to simultaneously pull on both ends, in particular at the introduction and departure conduits, in order to free detach the convolutions from one another and thus to obtain a separation device which can be used directly, after the fashion of that represented in FIG. 1.

Such separation devices, depending on the filter material which they contain, have multiple applications.

Figure 5:
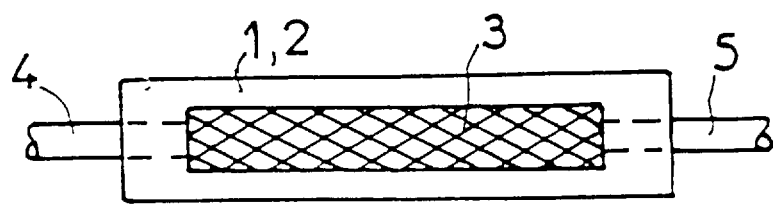
FIG. 5 is a diagrammatic view of the module of FIG. 4 represented in an expanded position.

In another embodiment of the invention represented in FIG. 5, the filter material is introduced into a heat-shrinkable or drawable casing, its volume being modulated so that, after shrinkage of said casing, the confinement obtained makes it possible to result in a forced separation under conditions which are adjustable by the degree of shrinkage.

Figure 6:
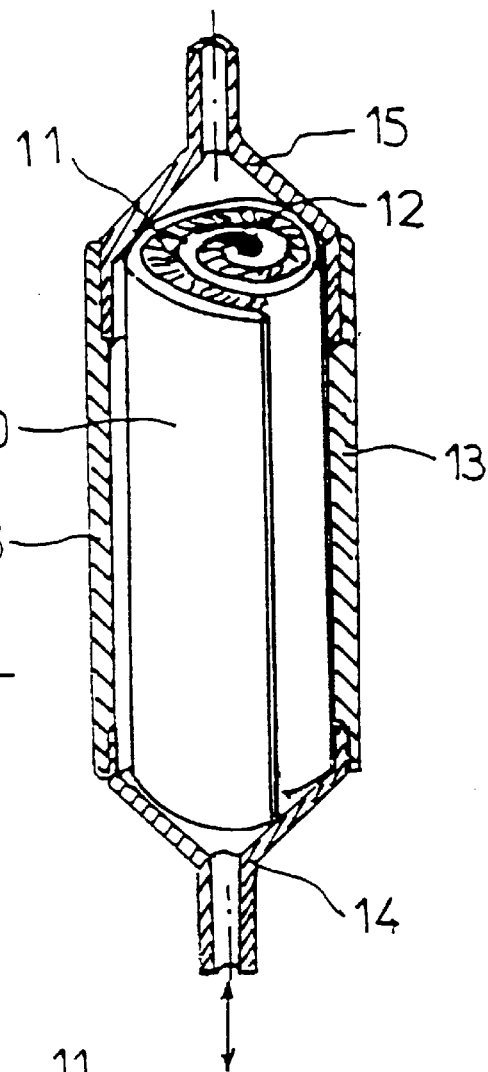

Another embodiment of the invention has been represented in FIG. 6. The leaktight casing (1, 2) of the versions described above, the first function of which is to force the fluid to be separated to follow its course and to undergo maximum contact with the filter material, is composed of a single-layer or a double-layer (10), based on a nonwoven or on a fabric, coated on one of its faces with a PVC or receiving a polyethylene film emplaced by adhesive bonding, in order to confer a degree of leaktightness on it. The casing thus produced is wound around itself in the form of a spiral, the interturn space of which receives the filter material (11), the face rendered leaktight being on the inside of each of the turns, and the central core (12) of which is, for example, composed of the folding of said envelope (10) on itself or of a PVC axle, to which said casing is adhesively bonded, in order to preclude any preferential progression or passage of the fluid to be separated.

The spiral thus produced is confined within a heat-shrinkable external sheath (13) which, depending on the duration of the heating stage to which the assembly, thus formed, is subjected, is more or less shrunk, thus making it possible to vary both the porosity of the module and the rate of passage of the fluid, the separative efficiency or the compactness of the module.

The module also contains two connecting pieces (14, 15), respectively for introducing the fluid to be separated and for collecting the fluid thus treated. The connecting pieces are flexible and are emplaced on the spiral before confinement by the heat-shrinkable sheath (13).

Figure 7:
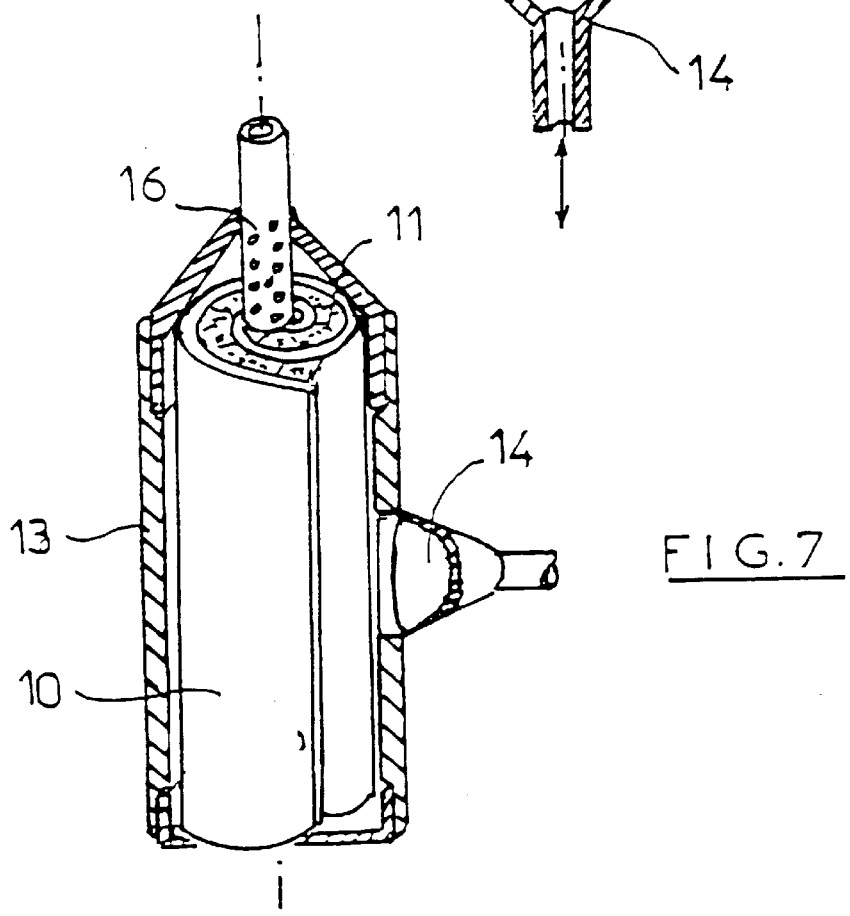
FIG. 7 is an alternative form.

In an alternative form of this embodiment represented in FIG. 7, the filter [sic] to be separated is supplied tangentially with respect to the spiral (10). In this case, the fluid follows the different concentric turns until it ends at a central drain (16), perforated over its entire length, situated at the core of said spiral and extending over the entire height of the latter. The two bases of the spiral are then equipped with compounds which preclude the passage of the fluid at these points, in this way preventing any preferential passage and forcing said fluid to follow the turns and thus to leach the filter material. The drain (16) is in communication with the means for discharge of the filtered fluid from the device.

The separation device of the invention is capable of a great many applications. First of all, in the field of biology, it proves to be entirely appropriate in the context of the inhibition of the bacterial action of a specific medium.

Thus, the device of the invention is employed for adsorbing antimicrobial agents or inhibitors contained in a biological liquid by passage in contact with the fabric constituting the filter material, before introducing the biological liquid (such as blood), thus purified, into a flask comprising a culture medium, in order to grow microorganisms liable to be present.

This application proves to be entirely advantageous in the context of the adsorption of antibiotics, three specific examples of which will be given in detail hereinbelow.

EXAMPLE 1

In this example, the filter material is. composed of a textile fabric produced from sulfonated polypropylene. The antibiotic tested is composed of netilmicin, at a concentration of 40 mg/l, contained in a 0.1M phosphated buffer medium at pH of 7.5. 10 ml of antibiotic solution are injected, using a syringe, into the introduction pipe of the separation device of the invention and the purified liquid is collected at the departure pipe.

The antibiotic is then quantitatively determined in the liquid thus collected according to the conventional agar diffusion technique in a Petri dish. The percentage of antibiotic adsorbed on the filter material is equal to:

$$\frac{\text{reference value} - \text{test value}}{\text{reference value}} \times 100$$

in which the reference value is the measured value of the buffer medium without separation by the device of the invention.

An adsorption yield of the antibiotic of greater than 99% is obtained.

EXAMPLE 2

The separation of the antibiotic of Example 1 is repeated, this time using a cation exchange textile, functionalized with carboxyl groups, as filter material.

The procedure and the quantitative determination technique are identical to those described in Example 1.

The result is an adsorption yield in the region of 66%.

EXAMPLE 3

Activated charcoal fibers are used as filter material.

The procedure and the quantitative determination technique are identical to those described in Example 1.

The test is carried out on different antibiotics in 0.1M phosphated buffer solution at pH 7.5.

The results obtained are collated in the table hereinbelow.

|  | Netilmicin | Vancomycin | Pefloxacin | Amoxicillin |
| --- | --- | --- | --- | --- |
| Concentration in mg/l in the buffer solution | 40 | 40 | 20 | 80 |
| Adsorption yield | 95% | 70% | 90% | 95% |

Moreover, the device comprising functionalized fibers on which are grafted one or a number of specific anti-ligands can also be used to disclose one or a number of ligand(s) in a biological fluid. The anti-ligand/ligand reaction, if it has taken place, can then be revealed:

either by elution using an appropriate eluent, the eluate obtained comprising the anti-ligand/ligand complexes formed, and subsequent visualization in the eluate by any appropriate tracer (by way of example, if the ligand is a protein, the presence of the anti-ligand/ligand complex can be revealed by a labelled antibody, if the ligand is a nucleic acid fragment, the polynucleotide/nucleic acid fragment complex can be revealed by a labelled polynucleotide, the sequence of which is complementary to at least a part of the sequence of the target nucleic acid fragment but at least partially different from the nucleotide sequence of the anti-ligand polynucleotide), or directly within said device by addition of a tracer as described above.

In another embodiment of the invention, the separation device is used for the purposes of concentrating a ligand liable to be present in a biological sample. According to the principle described above, the ligand is adsorbed on the functionalized fibers comprising a specific anti-ligand of said ligand. An appropriate solution is then passed through the device in order to break the bonds established between the anti-ligand and the ligand. The eluate collected comprises only the ligand. The action of the concentration of salts or of the temperature can in particular be used to elute the ligand. This is applicable in particular in the field of bacteriology for concentrating microorganisms before culturing and in the field of molecular biology for concentrating one or more desired target nucleic acid(s) before a subsequent stage which can be, for example, direct visualization as described above or an amplification reaction (for example PCR, NASBA, LCR, and the like) in order to multiply the number of copies of the target nucleic acid before detection.

The device of the invention also finds application in the field of the analysis of water for revealing pathogenic organisms or trace metals, in accordance with the principle described above. Once the sample withdrawn has passed through the device of the invention, the latter can be sent to the analytical laboratory for the desorption stage and analysis of the components. In this application, the device, in addition, exhibits the advantage of being easy to use in all circumstances and of being extremely easy to transport.

The device of the invention also finds an application in the field of chromatography when the fibers are functionalized or functionalizable using chemical groups, such as quaternary ethylamine or diethylaminoethyl groups, which confer anion exchange properties on them; carboxymethyl or sulfopropyl groups, which confer cation exchange properties on them; propyl, ethyl, butyl or phenyl groups, which confer hydrophobicity properties on them; C8 or C18 chains, for a reversed-phase support; groups inducing metal chelation, thiol groups or the like.

After the stage of adsorption of the desired compounds, specific elution buffers, which are known to the person skilled in the art, are passed through the device in order to desorb the adsorbed compounds. The device of the invention in this application has a significant advantage in that it can, after reequilibrating, be used for a new chromatography cycle.

Mention may also be made, among the numerous applications of the device of the invention, of the possibility of extracting a species which is soluble in an aqueous medium. To do this, a device in accordance with that described in FIG. 1 is used. The filter material is composed of activated charcoal fibers of 30×70 mm. 50 cm³ of an aqueous methylene blue solution, with a concentration of 2 mg/l, are injected into the introduction pipe of the module according to kinetics of 10 cm³/min. All the filtered liquid emerges colorless.

The identical operation carried out with the same amount of aqueous solution and with a filter material composed of activated charcoal fibers positioned perpendicularly to the plane of the module results in minimum decoloration; the residual coloration, measured by visible spectrometry, corresponds to 95% of the initial coloration.

The module in accordance with the invention is also capable of being used in the context of concentrating trace components and ultratrace components. Thus, the continuous filtration through a module of the invention comprising an IET (Ion Exchange Textile) makes it possible to result in a concentration of the trace components which it is desired to detect, up to the detection thresholds which can currently be used. Indeed, the detection of heavy metals proves to be impossible with conventional means for automatic monitoring when their concentration is less than the ppb level.

With the module in accordance with the invention, it thus becomes possible to detect the existence of hexavalent chromium present at the ppb level in a fluid containing trivalent chromium. The filter material is an IET carrying quaternary ammonium groups, sites which are strongly cationic ion exchangers.

Other applications can also be envisaged by means of the module of the invention. Mention may be made, for example and without implied limitation, of:

the extraction of traces of toxins in an industrial process: the selection of the filter material makes it possible to fix traces of nickel in electroplating effluents in order to reach the regulatory discharge threshold;

the recovery and the purification of proteins: in production, preservatives based on heavy metals are used, which it is advisable to remove without degrading the proteins. This removal is made possible by means of the module of the invention, the filter material of which is composed of a cation exchange textile support;

the concentration of β-emitter radioactive elements: said elements are fixed to an appropriate filter material and protected by the confinement casing produced from polyethylene. This casing makes it possible to handle the module by direct contact in order to render safe all the handling and dispatching operations and the like;

the combination of modules providing different functionalities makes it possible to define, in a single operation by selective analysis which is carried out subsequently, the medium or media, their family and the separative techniques which are appropriate.

Mention may be made, among the various advantages provided by such a device, of:

the possibility of having available a tool which is very simple to use, which is flexible and which is capable of thus allowing analyses and measurements to be carried out in-line and continuously;

the possibility of carrying out separations according to optimized kinetics, without, for all that, having a detrimental effect on the results and the quality of said separations;

the possibility of carrying out, at least cost, any type of simulation in the field of separation techniques and consequently of validating a separative treatment, whatever its stage of development;

the possibility of having available a simple and inexpensive concentration or separation system for diagnosis or with analytical purposes;

such a device can be easily rendered tamper-proof and can be dispatched by conventional forwarding means (post and the like);

the possibility of easily designing the device as a function of the characteristics of the fluid to be treated;

the possibility of easily interconnecting various modules of different functionalities;

in addition, taking into account its very structure, such a separation device is easy to sterilize but also convenient to remove from a waste treatment device (indeed, can be simply discarded) or can be regenerated in the context of the use of ion exchange textiles as filtration material;

moreover, due to the low ullages, the exchanges between the fluid to be filtered and the filter material take place under the best conditions.

In fact, such devices are very particularly suitable in conjunction with diagnostic tools or conventional components for separation, purification, decoloration, immobilization, filtration or retention.

We claim:

1. Apparatus for the physicochemical separation of constituents of fluids that includes a flexible leak-tight or semipermeable casing made of plastic which tightly envelopes a filter material to form a filter having or capable of adopting a flat profile, an inlet pipe for introducing a fluid into said filter, an outlet pipe for discharging said fluid from said filter whereby separation and filtering of the fluid takes place in the plane of the filter and with respect to the flat profile of the filter material, said casing being folded to form convolutes that contact each other at contact points and an adhesive means at said contact points for attaching the convolutes together prior to use, and said adhesive means having a bonding strength such that said convolutes become detached by the introduction of a fluid into said casing.

2. Apparatus for the physicochemical separation of constituents of a fluid that includes a pair of flexible leak tight or semi-permeable flat films that are joined along their outer peripheries to form a flat envelope lying within a plane, said envelope being completely filled with a flat bed of filter material for physicochemical separation of constituents of a fluid, an inlet pipe having an axis lying within said plane of the envelope for introducing a fluid into one end of said envelope, perpendicular to one edge of said bed, an outlet pipe having an axis lying in the plane of said envelope for discharging said fluid from the opposite end of said envelope wherein said fluid flows in contact with said bed of filter material along the entire length of said bed.

3. The apparatus of claim 2 wherein said films are plastic sheets that are heat welded together to tightly compact the filter material within the plane of said envelope to optimize contact between the fluid and the filter material.

4. The apparatus of claim 3 wherein said films are U-shaped sheets that are joined together to form an envelope having a pair of adjacent legs, and said inlet pipe being connected to one leg of the envelope and said outlet pipe being connected to the opposite leg of said envelope.

5. The apparatus of claim 3 wherein said films are formed of a heat shrinkable material that is shrunk to tightly pack the filter material within said envelope.

6. The apparatus of claim 2 wherein the films are formed of a non-woven or textile material having a polyethylene coating upon one face thereof.

7. The apparatus of claim 2 wherein the film are formed of a material selected from the group consisting of biocompatible polyethylene or polypropylene.

8. The apparatus of claim 2 wherein said filter material is selected from any one of a group of materials that consist of fibrous filamentary cellular or alveolate materials.

9. The apparatus of claim 2 wherein said filter material has constituents that are flnctionalized by grafting to confer ionic exchange properties thereto to create ion exchange textiles, hydrophilic textiles or hydrophobic textiles.

10. The apparatus of claim 2 wherein said filter material is selected from the group consisting of activated charcoal, asbestos, glass fibers, viscose cotton polypropylene, foam sponges and zeolite.

* * * * *

UNITED STATES PATENT AND TRADEMARK OFFICE
CERTIFICATE OF CORRECTION

PATENT NO. : 5,885,453
DATED : March 23, 1999
INVENTOR(S) : Roger Chatelin et al.

It is certified that error appears in the above—identified patent and that said Letters Patent is hereby corrected as shown below:

On the title page, please delete after [22] PCT Filed: "June 22, 1996" and insert --June 20, 1996--.

Signed and Sealed this

Twenty-seventh Day of July, 1999

Attest:

Attesting Officer

Q. TODD DICKINSON

Acting Commissioner of Patents and Trademarks